United States Patent [19]

Page

[11] 3,740,092
[45] June 19, 1973

[54] COLLAPSIBLE COVER ASSEMBLY FOR TRUCK BOXES AND THE LIKE

[76] Inventor: Robert J. Page, Bottineau, N. Dak. 58318

[22] Filed: Mar. 1, 1971

[21] Appl. No.: 119,475

[52] U.S. Cl. .............................................. 296/105
[51] Int. Cl. ............................................. B62d 25/06
[58] Field of Search ........................... 296/105, 100

[56] References Cited
UNITED STATES PATENTS

| | | | |
|---|---|---|---|
| 2,068,041 | 1/1937 | Tate | 296/105 |
| 2,469,958 | 5/1949 | Fowler | 296/105 |
| 3,481,645 | 12/1969 | Stepp | 296/105 |
| 3,606,448 | 9/1971 | Walker | 296/105 |

*Primary Examiner*—Leo Friaglia
*Assistant Examiner*—Robert R. Song
*Attorney*—Dugger, Peterson, Johnson & Westman

[57] ABSTRACT

A channel-shaped track extends along the upper edge of each side of a truck box, the channel-shaped configuration providing an upwardly facing slot. The tracks contain and guide a plurality of shoe mechanisms each comprised of a hinged pair of vertical panels. The laterally spaced ends of the bows, the flexible canopy being placed over the bows, are supported by the shoe mechanisms, there being one shoe mechanism for each bow end and the bow end functioning as a hinge pin in each instance. The lower marginal portions of the canopy are anchored to these panels. The rear portions of the tracks maintain the hinged panels in a straight line relationship, whereas the forward portions of the tracks permit the inward pivoting of the panels as the canopy is collapsed or retracted beneath a protective hood. The hood and sections of the tracks therebeneath can pivot upwardly to permit removal of the sides of the truck box. The rear of the truck box is equipped with a hinged tail piece that is automatically raised when the canopy is fully extended or expanded. Further, the tracks are formed so that moisture will not enter the interior of the truck box.

16 Claims, 14 Drawing Figures

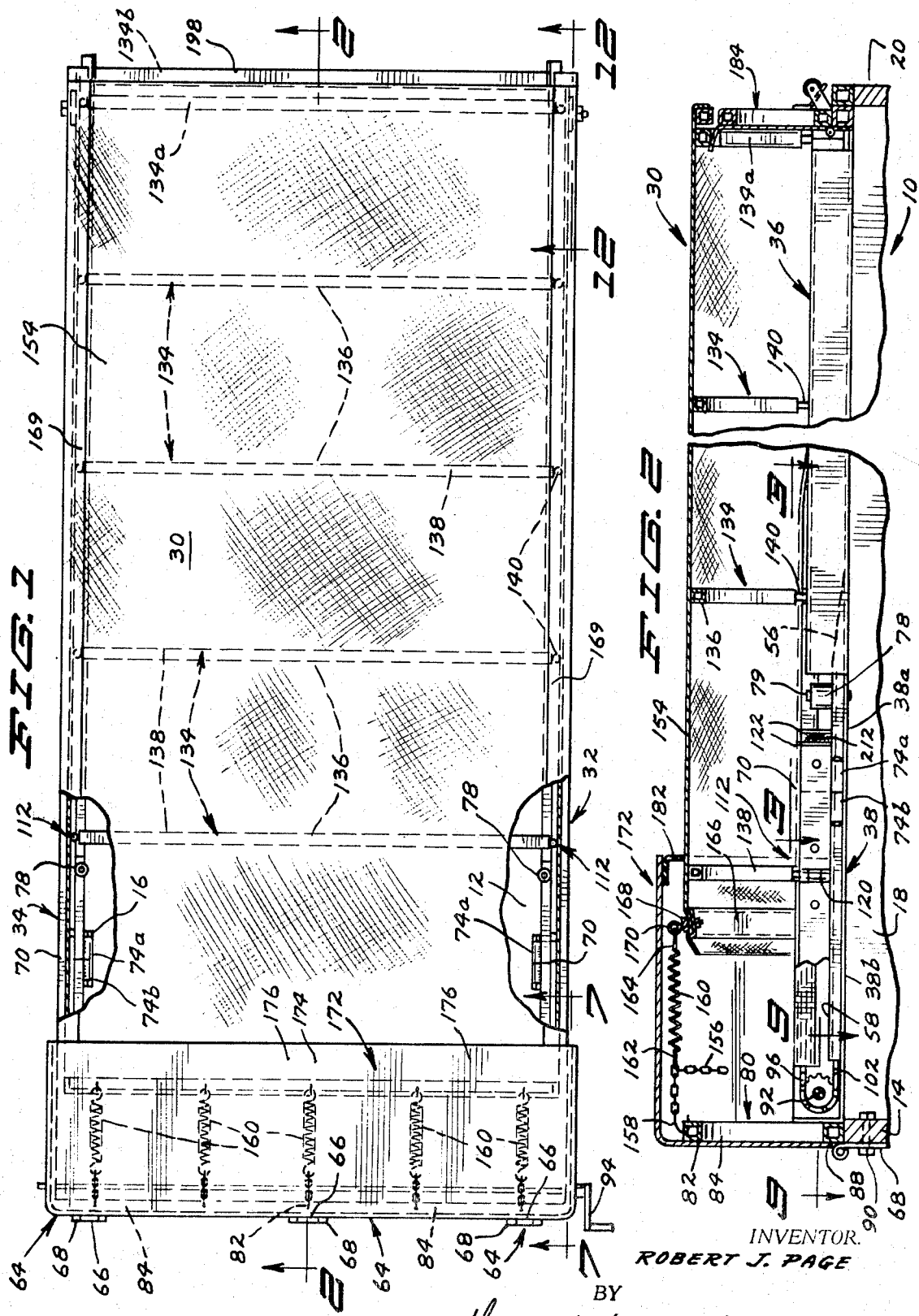

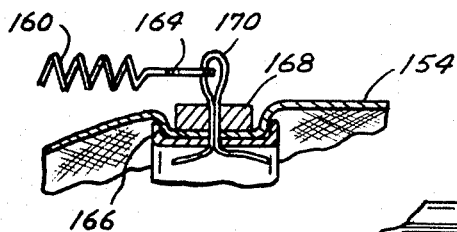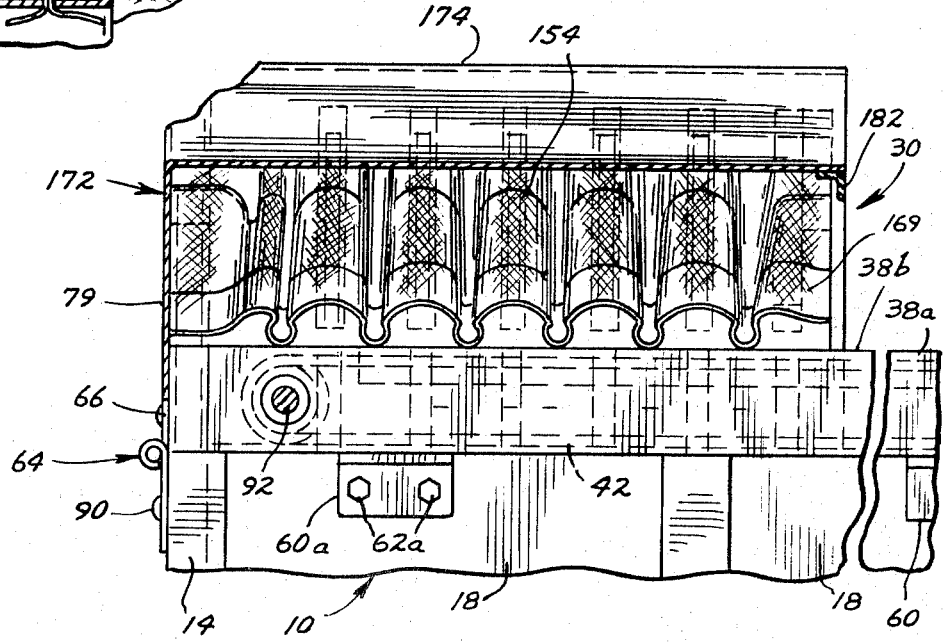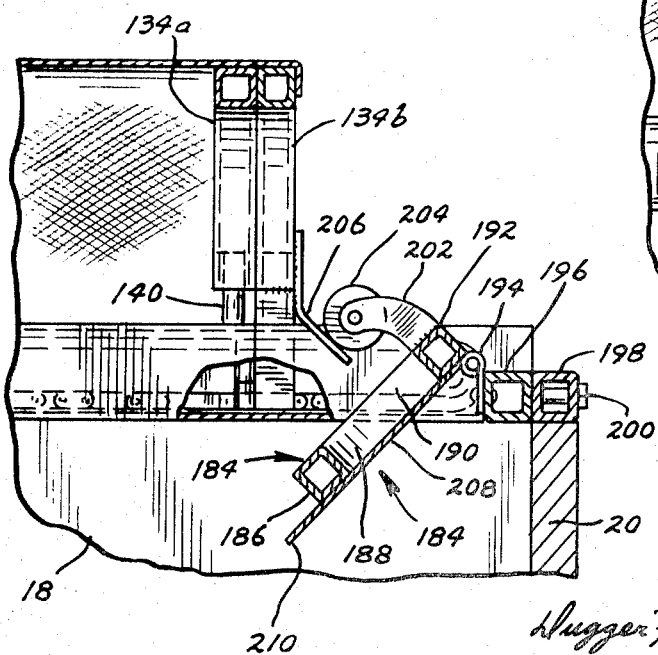

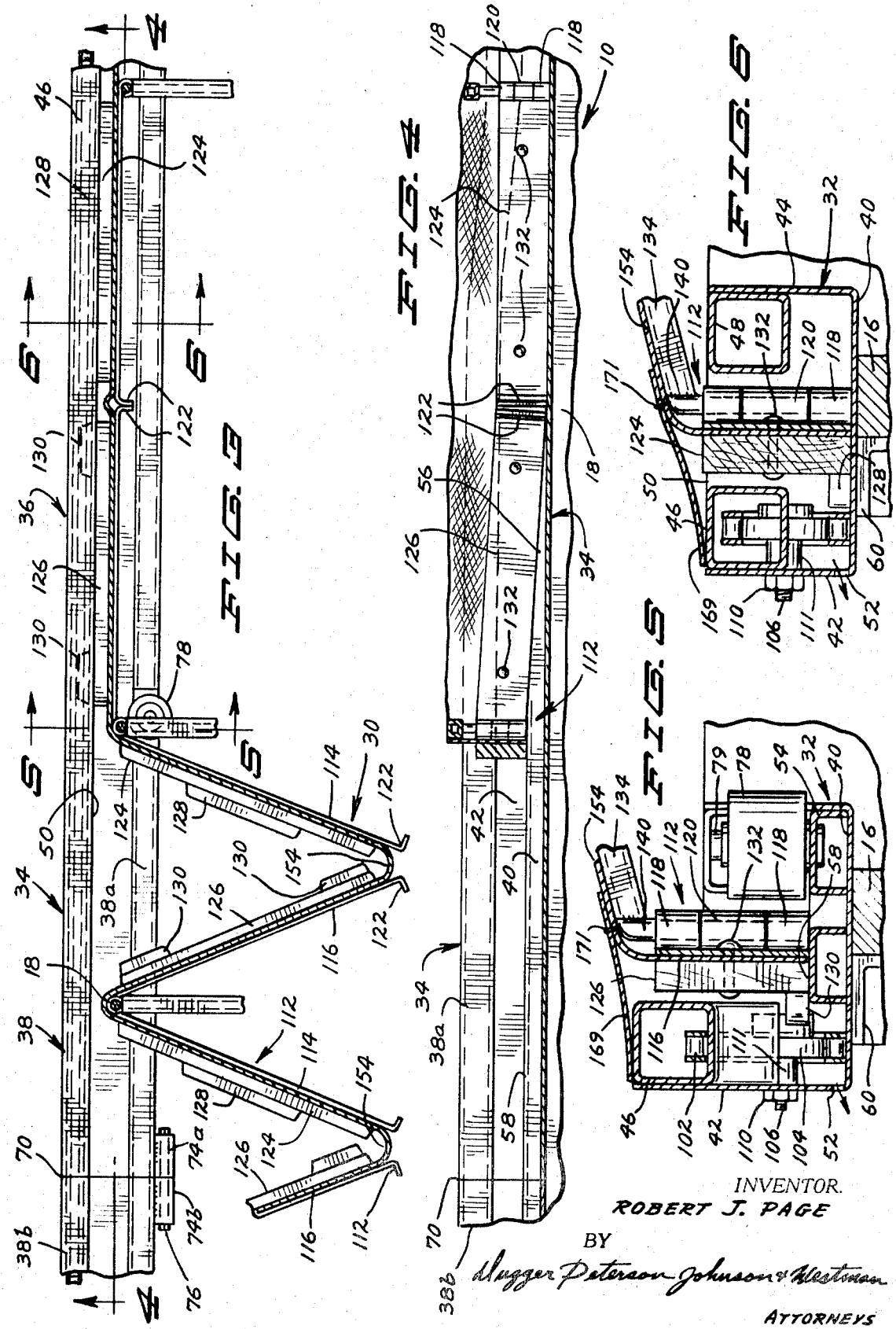

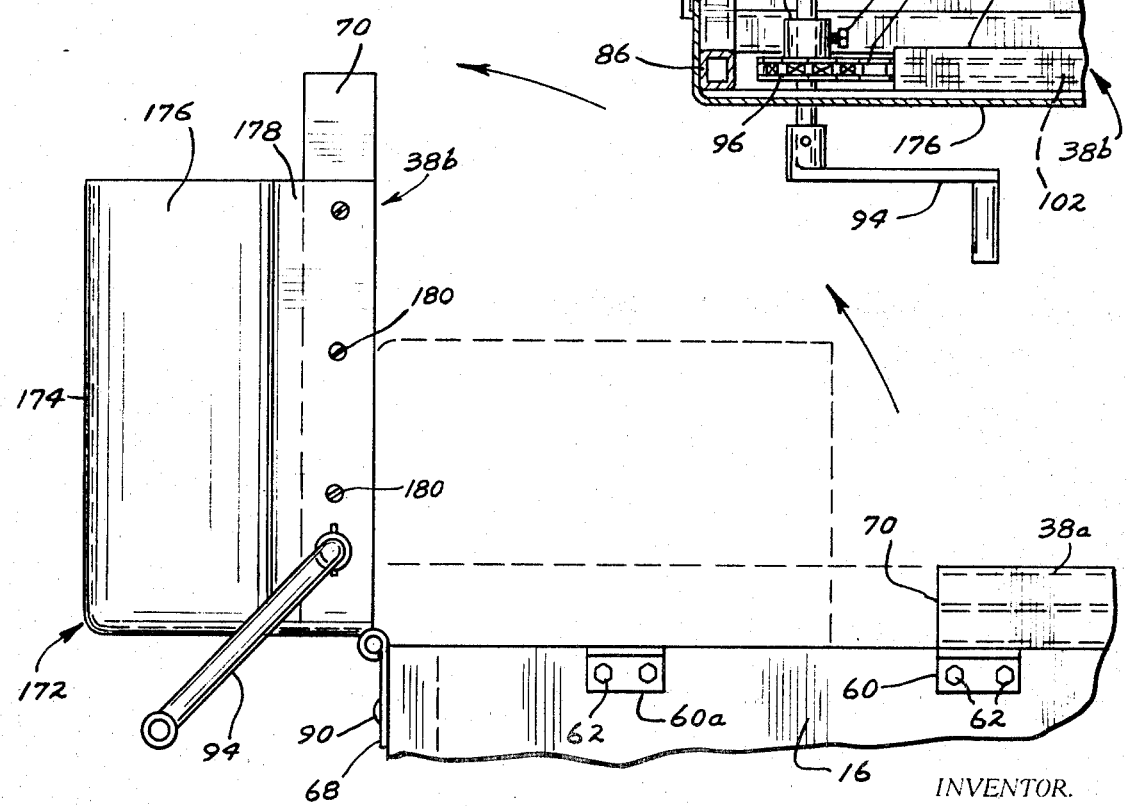

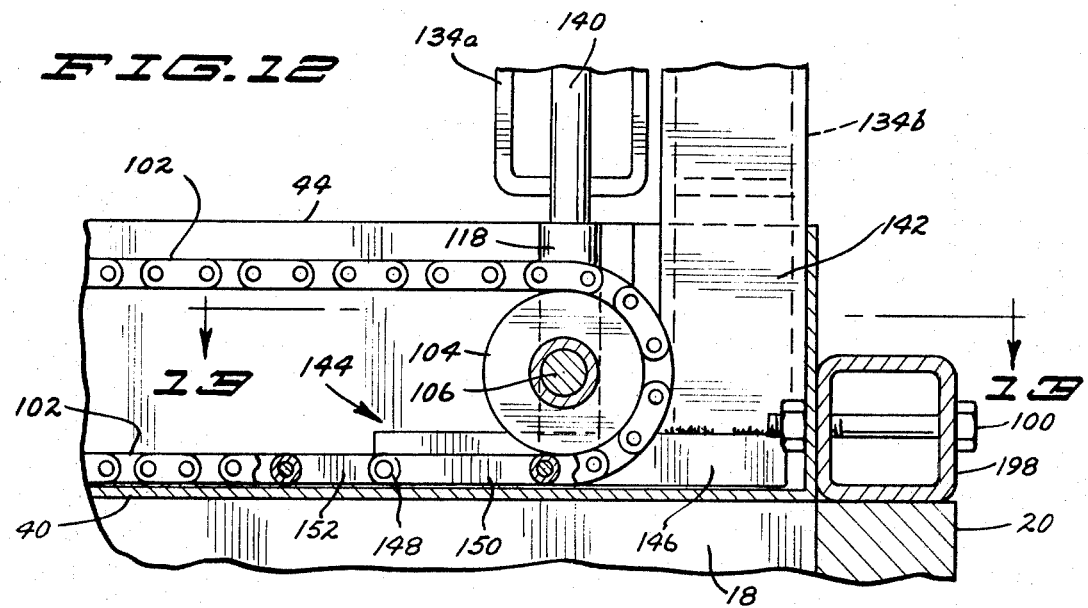
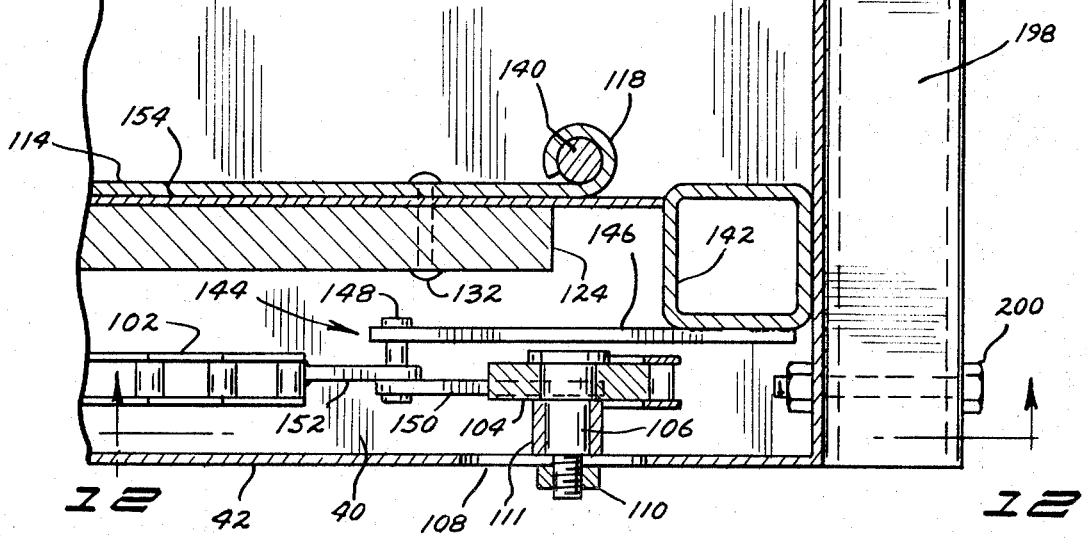

COLLAPSIBLE COVER ASSEMBLY FOR TRUCK BOXES AND THE LIKE

One object of the invention is to provide a collapsible cover assembly that can be readily expanded and retracted.

Another object of the invention is to provide a collapsible cover assembly that can be easily mounted on different types of truck boxes.

Another object of the invention is to provide a cover assembly that will permit the easy removal of the truck box sides and/or its end when circumstances so dictate, such as when oversize loads are to be transported.

Still another object of the invention is to provide a collapsible cover assembly that will effectively resist the entrance of moisture along each side. More specifically, an aim of the invention is to provide a channel-shaped track construction which accommodates the hinged panels that anchor the lower marginal portions of the flexible canopy, the rear portion of each track causing the panels to assume a 180° relationship and the forward portion allowing the panels to angle or pivot inwardly as the canopy is collapsed.

Yet another object of the invention is to close the rear end of the cover assembly, doing so by means of a tail piece that is automatically actuated upwardly into a closed position when the cover assembly is fully expanded.

Still another object is to provide a collapsible cover assembly that will be long-lasting and the parts of which are quite rugged, thereby resisting wear of the moving parts comprising my cover assembly.

Briefly, my invention includes a track along each side of a truck box or other bin or hopper. Each track is shaped so that when the cover or canopy is collapsed the hinged panels that support the canopy are free to pivot inwardly to permit the canopy to assume a folded or pleated condition. Yet when the canopy is fully expanded the tracks cause these hinged panels to assume a straight line relationship. Each track is formed in two sections, the foremost section being capable of being swung upwardly so that the sides of the truck box can be removed. Still further, when the cover assembly is fully expanded, there is a tail piece that is actuated from a generally horizontal position into a vertical position, thereby closing or blocking the opening that would otherwise exist at the rear of the canopy. Integral side walls and drip ledges assure that moisture will be directed outwardly and not inwardly into the interior of the truck box or other hopper with which my assembly is employed.

In the drawings,

FIG. 1 is a top plan view of a typical truck box with the canopy of my cover assembly shown fully extended;

FIG. 2 is a cross sectional view taken in the direction of line 2—2 of FIG. 1, an intermediate portion of the depicted assembly being removed;

FIG. 2A is a fragmentary enlargement of a portion of FIG. 2 depicting to better advantage how the forward end of the flexible canopy is clamped;

FIG. 3 is a sectional view taken along the line 3—3 of FIG. 2, the cover assembly, however, being in the process of being retracted;

FIG. 4 is a longitudinal sectional view through the track of FIG. 3, the view being in the direction of line 4—4 for the purpose of showing the ramp that elevates or raises the various shoe mechanisms at one side of the truck box;

FIG 5 is a transverse section taken in the direction of line 5—5 of FIG. 3 to illustrate further the configuration of the ramp that is associated with each track and also to show to better advantage the cross sectional make-up of one of the shoe mechanisms;

FIG. 6 is a sectional view similar to FIG. 5 but taken along line 6—6 of FIG. 3 at a location more toward the rear of the truck box and therefore before the ramp starts to rise or incline;

FIG. 7 is a fragmentary side elevational view taken in the direction of lien 7—7 of FIG. 1, but illustrated on a somewhat larger scale and with the cover assembly fully retracted to a location beneath the hood;

FIG. 8 is a fragmentary side elevational view of the hood and the foremost track sections when swung upwardly as a unit, the location of the view corresponding generally to the location at which the sectional view represented in FIG. 7 is taken;

FIG. 9 is a sectional view taken in the direction of line 9—9 of FIG. 2;

FIG. 10 is a fragmentary sectional view of the rear portion of FIG. 2, the view depicting on a larger scale the rear end of the cover assembly in a fully expanded condition and with the tail piece vertical;

FIG. 11 is a view corresponding to FIG. 10 but with the tail piece just about to be moved from its lowered position depicted in FIG. 10 to its raised or closed position depicted at the right in FIG. 2;

FIG. 12 is a vertical sectional view in the direction of line 12—12 of FIG. 1, and FIG. 13 is a sectional view taken in the direction of line 13—13 of FIG. 12.

Although my invention is susceptible for use with various types of hoppers, bins and the like, it will be described in conjunction with a typical truck box which has been denoted generally by the reference numeral 10. The box 10 includes a floor 12, a front vertical panel 14, a left side panel 16, a right side panel 18 and a rear panel 20. It will be understood that the truck box 10 is mounted on a vehicle and the panel designations given immediately above would be when a person is facing toward the driver's cab. Additionally, it is sometimes required that the side panels 16 and 18 be removed, and also the rear panel 20, especially to permit the transporting of oversize loads. My invention, as will become clearer as the description progresses, enables the operator to easily remove the panels.

My collapsible cover assembly has been designated generally by the reference numeral 30. It comprises a pair of tracks 32 and 34 which extend along the upper edges of the panels 16 and 18, respectively. The manner in which the tracks 32, 34 are attached to the panels 16 and 18 will be described shortly. At this time, owing to the importance of the configuration of each track 32, 334, reference should be made to the longitudinal sectional view, this being FIG. 3, and also to the transverse sectional views set forth in FIGS. 5 and 6. The rear portion of each of the tracks 32, 34 has been given the reference numeral 36 and the forward portion thereof the numeral 38. From FIG. 6 it will be perceived that the rear portion 36 is channel-shaped. More specifically, the rear portion 36 includes a bottom wall 40, an outer side wall 42, and an inner side wall 44. By means of a length of square cross section tubing 46 and a similar section of tubing 48, which is welded in each instance to its associated side wall 42 or 44, there is formed an upwardly directed slot 50 therebetween.

The outer side wall 42 contains a number of weep holes 52 via which moisture can be gravitationally discharged from the inside of the track portion 36.

The forward track portion 38 is different from the rear portion 36 in several respects. However, there are some similarities and the similarities will be described first. Accordingly, it will be discerned that the bottom wall 40 continues forwardly through the portion 38. Also, the outer wall is merely a continuation of the previously mentioned wall 42 and therefore carries the same reference numeral. Likewise, the tubing 46 extends along the inner face of the side wall 42 and has been designated accordingly. Still further, the outer side wall 42 of the portion 38 contains additional weep holes 52 so that water can drain outwardly from this region as well as from the region constituted by the rear portion 36. It is to be understood that each track 32 and 34 is a mirror image of each other as far as its cross sectional make-up is concerned. This will become even clearer as the description continues. The salient difference embodied in the forward portion 38 resides in the fact there is a drip ledge 54 having an appreciably lesser height than the inner side wall 44. Nonetheless, the height is sufficient so as to preclude drainage into the interior of the truck box 10. Although it will not be readily understood at this stage of the description, there is a ramp 56 inclining upwardly from the bottom wall 40, this being a second structural difference as far as the portion 38 is concerned. The ramp 56 continues upwardly and then levels off to form a horizontal platform 58 residing in the same horizontal plane as the upper surface of the drip ledge 54.

Although susceptible to variation, it might be well to give certain typical dimensions for the tracks 32 and 34. Quite obviously, the length of these tracks will be coextensive with the length of the truck box 10. There is really no limit as to the length of the box 10. Some boxes, when used for hauling grain, approximate 35 feet in length but could be even 50 feet. On the other hand, sometimes the boxes are only 12 to 14 feet in length. The height of the tracks 32, 34, more specifically the height of the side walls 42 and 44, has been selected in practice to be two inches. The width of each track, that is the width of the bottom wall 40 has been on the order of three and one-half inches. The tubing 46 and 48 can be one inch square in cross section. However, the drip ledge 54 is only about one-half inch high, having a width of 1 inch. This can be simply an inverted channel. Similarly, the platform 58 may constitute an inverted channel but should have a width approximating one inch because of the function it performs. The ramp 56 inclines upwardly from the bottom wall 40 to the level of the platform 58. These various parts have been constructed from No. 14 gauge steel.

Turning now to the manner in which the tracks 32 and 34 are attached to the side panels 16 and 18 of the box 10, reference should be made to FIGS. 5, 6, 7 and 8. Any preferred number of angle irons 60 can be employed, the horizontal leg thereof being welded to the underside of the bottom wall 40 of each track. The vertical legs of the angle irons, on the other hand, have bolts 62 passing therethrough and also through the side panel 18 in FIG. 7 and through the panel 16 in FIG. 8. Whereas the angle irons 60 are welded to the underside of the bottom wall 40 of each track, there are additional angle irons labeled 60a having bolts 62a passing therethrough to mount them to the panel 16 or 18. For a reason given below, these angle irons 60a are not secured to the underside of the tracks.

It will be recognized that the side panels 16 and 18 will at times require removal, or at least it will be desirable to remove these panels in order to make room for overhanging loads. The present invention takes this desideratum into account, for several hinges 64, each having hinge sections 66 and 68, are provided which pivotally mount the foremost ends of the tracks 32 and 34, more specifically the foremost extremities of the portions 38 of each track in a manner hereinafter explained more fully. The forward portions labeled 38 are actually split at 70, and to facilitate the ensuing description it will be well to label the section that is fixed by the reference numeral 38a, whereas the section that is to be swung upwardly is identified as 38b. It will be recalled that the rear portion of each track 32, 34 has been identified by the reference numeral 36. Thus, the forward portion of the tracks 32, 34 has now been considered to be two individual sections, the section 38b at each side being capable of being swung upwardly by reason of the hinges 64, the split 70 permitting this to occur. The raised condition of the track sections 38b can be seen in FIG. 8; however, more will be said concerning this feature as the description progresses. At this time, though, it should be pointed out that each track section 38a has a tube 74a welded thereto, a similar tube 74b being welded to the track section 38b in an axially aligned relationship. By means of bolts or pins 76, the track sections 38b can be latched or held down with respect to the sections 38a so that they will not inadvertently swing upwardly, yet removal of the two bolts 76 will permit these sections 38b to be raised along with a protective hood still to be referred to.

For a reason presently to be made manifest, a roller 78 is journaled on a vertical pin 79 extending upwardly from the bottom wall 40, there being one such roller 78 for each track. The specific longitudinal location of the roller 78 with respect to its particular track 32 or 34 is at the dividing line between previously mentioned rear portion 36 and the forward portion 38. More specifically, it can be seen from FIG. 1 that the two rollers 78 are located where the inner side wall 44 ends and where the drip ledge 54 begins. The two rollers 78, there being one such roller at each side in that one is associated with the track 32 and the other with the track 34, function as guides for members hereinafter referred to.

A head piece denoted by the reference numeral 80 is pivotally attached to the hinge section 66 of each hinge 64 and the section 66 is in turn attached to the upper portion of the front panel 14 of the truck box 10. The head piece 80 has a peak or apex 82 and downwardly sloping portions 84 which terminate in vertical sides 86. A horizontal bottom portion 88 connects between the lower end of the vertical sides 86. By means of bolts 90, the hinge sections 68 are attached to the front panel 14.

The vertical sides 86 of the head piece 80 serve to journal a crank shaft 92 having a crank 94 thereon. The crank 94 permits manual rotation of the shaft 92, although an electric motor may be used if so desired. A pair of sprockets 96 each have an integral collar 98 that encircles the shaft 92 at spaced lateral locations and by means of a set screw 100 for each collar 98 each sprocket 96 can be angularly or rotatively adjusted on the crank shaft 92. The reason for this will not yet be apparent, but it can be generally mentioned at this stage of the description that the reason for the individual rotative positioning of the sprockets 96 is to effect a squaring or truing of the cover assembly 30 when extended for the first time. Each sprocket 96 has a continuous roller-type chain 102 in mesh therewith. The chain 102 in each instance passes about a rear idler roller 104, which is cylindrical and does not have to have any teeth corresponding to those on the sprocket 96. The roller 104 in each instance is mounted on a shoulder bolt 106, the roller 104 actually rotating about the larger diameter portion of its particular shoulder bolt 106. A horizontal slot 108 is formed near the rear of each outer side wall 42, the slots 108 accommodating or receiving the reduced end section of each shoulder bolt 106. Through the agency of a nut 110 threadedly carried on the projecting end, that is the end extending through the slot 108 in each instance, the shoulder bolt 106 can be held fast or fixed and thus position the roller 104 rotatively mounted thereon at a fixed position, yet loosening of the nut 110 will permit individual adjustment of the particular shoulder bolt 106 and the roller 104 carried thereon. The adjustability alluded to above is necessary in order to permit the chains 102 to be removed when the side panels 16 and 18 are to be taken off. It perhaps should be explained at this point that the upper reach or flight of the chain 102 passes through the upper tube 46, whereas the bottom reach of the chain 102 moves along the upper surface of the bottom wall 40 of the track 32 or the track 34.

Playing a very important role in the practicing of the present invention is a plurality of shoe units or mechanisms 112. Each shoe unit 112 includes a pair of elongated panels 114 and 116, the panel 114 having hinge knuckles 118 integral therewith, and the panel 116 having a knuckle 120 thereon which interleaves or interfits with the knuckles 118. The hinge pin that extends downwardly through these knuckles 118, 120 will be referred to hereinafter. At this time, it will be discerned that there are inturned ends 122 that function as bumper elements at the opposite ends of the panels 114, 116. As their name implies, the bumpers 122 simply abut each other when the shoe units 122 are pulled toward each other and separated from each other when the collapsible cover assembly 30 is being retracted or expanded as will be described shortly. The panel 114 has a backup plate 124 and the panel 116 has a similar backup plate 126. A hold-down strip or rib 128 is fixedly carried on the plate 124, whereas a pair of hold-down strips or ribs 130 are disposed on the plate 126. Here again, as the name implies, these strips or ribs 128, 130 prevent the shoe units or mechanisms 112 from lifting or rising out of the tracks 32, 34, more specifically preventing these units or mechanisms from moving upwardly through the slot 50 of these tracks. Inasmuch as the strip or rib 128 is located in the middle of the plate 124, and the strips or ribs 130 at the ends of the plate 126, a nesting relationship to conserve space results during the collapsing of the assembly 30 as will become more evident later on. Any preferred number of anchor screws or rivets 132 pass through the panels 114 and 116, as well as through the backup plates 124 and 126, respectively. These screws or rivets 132 function to hold the lower marginal portions of the flexible canopy yet to be described.

The general shape of the head piece 80 has been referred to. A plurality of bows 134 having a tubular configuration as far as their cross section is concerned, the cross section being generally the same as that for the head piece 80. In this regard, it will be discerned that each bow 134 has a peak or apex at 136 and downwardly sloping sections 138. It will be appreciated that the apex 136 corresponds to the apex 82 of the head piece 80 and the sloping portions 138 to the sloping portions 84. Instead of the vertical slides 86 which are integral with the head piece 80, individual vertical pins 140 are welded to the laterally spaced ends of each bow 134. It is at this time that it can be explained that the two pins 140, there being a pair for each bow 134, extend vertically downwardly into the previously mentioned knuckles 118 and 120 of the particular shoe unit or mechanism 112 at each side which is to support the particular bow 134 in a vertical relationship and at the same time support the particular bow for longitudinal movement in a fore and aft direction with respect to the box 10. Stated somewhat differently the shoe units or mechanisms 112 guide the laterally spaced ends of the bows 134 rectilinearly along the tracks 32 and 34 when a cover assembly 30 is expanded or retracted.

At this time attention is called to a bow 134a which is like the bows 134 in that it has a vertical and downwardly extending pin 140 at each end thereof. However, the pins 140 in this instance extend downwardly into the hinge knuckles 118 of only a single panel 114. The panel 116 of which each full shoe unit or mechanism 112 is comprised is not utilized at the rear because there would have to be an additional or projecting portion of the track 32 and 34. In other words, the bow 134a is carried by what can be best termed to be a one-half shoe unit or mechanism 112. Actually, though, it is preferable that the knuckle 118 be either composed of two portions or that the knuckle 118 extend from the top edge of its panel 114 to the lower edge thereof. It will be appreciated that by not using the second elongated panel 116, the pin 140 extending into the particular knuckle 118 should be adequately supported through the major vertical length thereof. A second bow 134b is actually of a modified construction as compared with the bows 134 and the bow 134a. It has a similar cross section but instead of the pins 140, it has vertical sides or legs 142 that correspond to the vertical sides 88 of the head piece 80.

Reference should be made at this time to the fastening means identified generally by the reference numeral 144 which functions to connect the modified bow 134b at each side or end thereof to the previously mentioned chains 102. Consequently, the fastening means 144, there being one such means at each side of the box 10, includes a strip 146 that is preferably welded directly to the vertical sides or legs 142 of the bow 134b. The strip 146 extends forwardly and has transverse pin 148 extending therethrough. By reason of link strips 150 and 152 through which the pin 148 extends, the pin 148 actually connecting the adjacent ends of the link strips 150 and 152 together and also connecting these strips 150, 152 to the strip 146. The opposite ends of the link strips 150 and 152 are welded to the particular rollers belonging to the free ends of the chain 102 at each side. It will be appreciated that the two fastening means 144 are instrumental in allowing the rear bows 134a and 134b to be moved to an extreme rearward position with respect to the tracks 32 and 34. In this regard, the rollers 104 about which the chains 102 pass can be mounted somewhat forwardly of the extreme rear end of each track 32, 34 and yet cause the rearmost bows 134a and 134b to be moved to the extreme or most rearward position on the tracks 32 and 34. In other words, the cover assembly 30 can be expanded so as to cover or protect the full length of the box 10 without having any extensions projecting rearwardly therefrom. It can be pointed out that the fastening means 144 at each side of the assembly 30 constitutes the sole mechanical connection with the two chains 102. The two bows 134a and 134b are fixedly attached to each other, such as by screws (not shown); the feature to be borne in mind is that the two bows 134a and 134b move in unison, the transmitting force which produces the movement being provided by the chains 102 and the respective fastening means 144.

Having presented the foregoing description, it can now be pointed out that a flexible canopy 154 constitutes the protective cover that is expanded and retracted. Thus, an important element of my cover assembly 30 is the canopy 154, which can be of canvas or a plastic coated fabric (or actually any flexible sheet material that is generally water resistant). The forward marginal portion of the canopy 154 is anchored, although resiliently, to the head piece 80 through the agency of a plurality of relatively short chains of the link variety, these chains being labeled 156 in FIG. 2. It will be discerned that each chain 156, although only one such chain 156 is visible, has a hook end at 158 by means of which it can be attached to the head piece 80, more specifically through appropriately spaced holes in the sloping or inclined portions 84 of the head piece 80. Each chain 156 is associated with a coil spring 160 having hook ends 162 and 164. Although only one coil spring 160 is visible in FIG. 2, a plurality of springs appear in phantom outline in FIG. 1. It will be appreciated that hook end 162 can be inserted through any appropriate link of the chain 156 with which it is to be related. On the other hand, the other hook end 164 is engaged with the flexible canopy 154, in a manner described below.

It should be explained that it is contemplated that truck boxes will be of different lengths and in this regard the forward end of the canopy 154 must be or should be cut to suit the overall length of the particular box 10 with which the assembly 30 is to be used. Therefore, after appropriately cutting the material constituting the canopy 154, it is clamped by means of a channel member 166 having a strip 168 placed above the flexible material. A plurality of cotter pins 170 extend downwardly through aligned holes formed in the channel 166 and the strip 168 received therein/. In this way, the various cotter pins 170 have their upwardly directed eyes or loops available for receiving the hook ends 164 of the coil spring 160. The lower ends of the cotter pins 170 can simply be spread apart to assure their retention in the foregoing clamping arrangement. Hence, the function of the chains 156 is to always assure that the springs 160 will pull the canopy 154 taut when the cover assembly 30 is fully extended, the proper selection of chain length causing the springs 160 to be stretched or elongated sufficiently to accomplish this. In other words, the elasticity provided by the coil springs 160 can be controlled by selecting the proper effective length of the chains 156, that is by dropping or adding links to compensate for different length boxes on which my assembly 30 may be mounted without having to change the length of the coil springs 160.

A protective strip 169, preferably of the same material as the canopy 154, is stitched at 171 to each side of the canopy 154 so as to overlie the track 32, 34 as best viewed in FIgS. 5 and 6. The strip 169 sheds most of the moisture that would otherwise enter into the track 32 or 34 via the slot 50. The strip 169, in each instance, is sufficiently flexible so that it does not interfere with the folding of the canopy 154.

A protective hood 172 conforming also generally to the head piece 80, and also to the various bows 134, has a peak or apex at 174, downwardly sloping panels 176 and vertical sides 178, the sides 178 being vertical when the hood 172 is in the position in which it appears in FIGS. 1 and 2. The hood 172, which can be of reinforced polyester plastic, has mounting screws 180 extending through the lower marginal portions of its vertical sides 178, the screws 180 being threadedly engaged with tapped holes formed in the hinge track sections 38b. In other words, the hood 172 and the track sections 38b are swung upwardly when the side panels 16, 18 are to be removed, this relationship being pictorially presented in FIG. 8. A rubber flap 182 may be added to the hood 172, as seen in cross section in FIG. 2, to render it more weather proof and moisture resistant. Unlike the angle irons 60, the angle irons 60a are not welded to the track sections 38b as previously mentioned in a general fashion. Instead, the upper faces thereof merely underlie the track sections 38b; however, the bolts 62a anchor these angle irons 60a to the sides 16 and 18 of the box 10, as can be best seen from FIGS. 7 and 8. The angle irons 60a, as should be readily apparent, are not completely essential, for the track sections 38b can rest on the upper edges of the panels 16 and 18. Of course, the previously mentioned bolts 76 are removed from the tubes 74a and 74b in order to permit the hood 172 and the track sections 38b to be swung upwardly into the position depicted in FIG. 8.

Whereas the hood 172 provides protection at the forward end of the box 10, a tail piece 184 provides protection at the rear. It will presently be understood that without the tail piece 184 there would be an opening that would permit rain and dust to enter. The tail piece 184 has a peak or apex 186, sloping portions 188 and vertical sides 190 so as to conform to the general shape of the head piece 80 and more importantly to the various movable bows 138 and 138a, 138b. The tail piece 184 is provided with a horizontal base 192 and also a reinforcing trusses or struts (not shown). The base 192 of the tail piece 188 is hinged at 194 to the forward tube 196 of two tubes 196 and 198, the base 192 being attached to the tube 196 by screws 200. The two tubes 196 and 198 are fixedly secured to each other, as by welding or with screws, and the rear tube 198 is in turn fixedly attached to the upper edge of the rear panel 20 of the box 10. It will be appreciated that the screws 200 permit the detachment of the tail piece 184 from the rear panel 20.

In order to render the tail piece 184 automatically effective as far as its closing action is concerned, a pair of arms 202 extend generally rearwardly from the base 192 at each end thereof, this being at each side of the cover assembly 30, the arms being integral with the horizontal base 192. Rollers 204 are carried at the free ends of the arms 202 and are thus disposed so as to be engaged by obtusely configurated actuating cams or strips 206 attached to the previously mentioned vertical sides or legs 142 belonging to the bow 134b. Engagement of the rollers 204 by the camming strips 206 causes the tail piece 184 to pivot upwardly from the lowered position seen in FIG. 10 into its vertical or closing position seen in FIG. 11, the latter position blocking the opening that would otherwise exist at the rear of my cover assembly 30. Quite obviously the tailpiece 184 has a suitable flexible covering 208, such as the same type of material constituting the canopy 154, disposed thereon so that the opening will be closed thereby. Also, a rubber strip or flap 210 is attached to the upper edge of the tail piece 184, functioning as a seal when the tail piece is vertical, as is evident in FIG. 11.

As already pointed out, only the rearmost bow labeled 134b is connected to the two actuating chains 102, this being through the agency of the fastening means generally denoted by the reference numeral 144 which is illustrated in FIGS. 12 and 13. In this way, the rearmost bow 134a is actuated forwardly and rearwardly by means of the connection 144. Of course, the bow 134a, being fastened to the bow 134b, moves in unison therewith. With this recapitulation, it is believed evident that when the cover assembly 30 is fully expanded or extended, there will be a spacing 212 (FIG. 2) deliberately provided between each adjacent shoe unit or mechanism 112. Stated somewhat differently, each shoe unit or mechanism is a distinct and separate unit and it is intended that the bumpers 122 engage each other so as to transmit the collapsing force from one to the other after the spacing or clearance has been eliminated. Depending largely upon the type of material used for the canopy 154, there will be some expansion and contraction in the specific area and the alluded to space 212 permits such expansion and contraction occur.

From the foregoing, it should be apparent as to how my cover assembly 30 functions. Once mounted, as already described, rotation of the crank 94 (or operation of a motor when provided) in a clockwise direction will rotate the shaft 92 to cause the sprockets 96 to turn in a direction to move the lower sections of both chains 102 forwardly. By reason of the connection provided by the fastening means 144, the rearmost bow 134b is pulled forwardly. This starts the collapsing or retracting action. Very shortly, the bumper 122 on the rearmost elongated panel 144 at each side of the assembly 30 (there being one such panel 114 hinged to one end of the bow 134a and a second such panel hinged to its other end) abuts the bumper 122 of the shoe mechanism or unit 112 immediately forwardly thereof. This progressive action continues, eliminating the individual spaces 212 between bumper 122 in the process, until the shoe mechanisms 122 are all pushing against each other. It is when the shoe mechanisms 112, which have heretofore been rearward of the guide rollers 78, pass by these rollers 78 that they can begin to pivot inwardly. More specifically, the various panels 114, 116 being hingedly connected to each other, start to pivot inwardly because the inner side wall 44 terminates at these rollers. In other words, the rear portions labeled 36 of the tracks 32 and 34 end and the forward portions 38 begin where the rollers 78 are situated. Thus, instead of a relatively high inner side wall 44 for each track 32, 34 there is only the relatively low drip ledge 54. However, before the drip ledge 54 is reached, the ramp 56 has served to elevate the advancing shoe units 112 so that the lower edges of the panels 114 and 116 are slightly above the top of the drip ledge 54. This permits the free edges, that is the edges remote from the knuckles 118 and 120 (more specifically the edges having the bumpers 122 associated therewith) to move inwardly, as can be seen from FIG. 3. When fully collapsed, the entire canopy 154 is beneath the hood 172.

With the cover assembly 30 fully collapsed as outlined above, the hood 172 together with the track sections 38b, can be swung upwardly from the position thereof illustrated in FIG. 7 into the position pictured in FIG. 8, by first disconnecting the roller chain 102 at 144 and also removing bolt 76, doing so at each side, of course. The side panels 16, 18 of the box 10 can then be removed.

It will be appreciated that as the cover assembly 30 is collapsed or retracted the tail piece 184 pivots gravitationally downwardly into the below-horizontal position illustrated in FIG. 10. On the other hand, when the cover assembly 30 is expanded, then the tail piece 184 is raised from the position of FIG. 10 to that of FIG. 11 by virtue of the cams or arms 202 striking the rollers 204.

It will be recalled that the set screws 100, as best understood from FIG. 9, enable the user of my cover assembly 30 to individually adjust the sprocket 96 at one side angularly relative the sprocket 96 at the other side. This is only done initially, if need be, to shift one chain 102 with respect to the other and thereby eliminate any skew or lack of squareness of the rearmost bow 134b. Parallelism between all of the bows 134, 134a and 134b is in this way obtained.

It should be distinctly understood that the construction herein presented affords virtually complete protection against the entrance of moisture into the truck box 10. This is by reason of the inner side wall 44 and the drip ledge 54. However, in the region of the drip ledge 54 the shoe mechanisms 112 have been raised so that there is no interference with the inward pivoting of the hinged panels 114 and 116. Likewise, the cargo being transported is protected against the entrance of dust and dirt, for any such foreign matter to enter requires the traversing of a rather tortuous path. Consequently, my cover assembly 30 has been found exceedingly effective and efficient in actual practice.

I claim:

1. A collapsible cover assembly for truck boxes and the like comprising a pair of spaced tracks extending along the sides of the box, a plurality of shoe mechanisms guided for longitudinal movement by said tracks, each shoe mechanism including a pair of elongated panels hinged together about a substantially vertical axis at their adjacent ends, a plurality of bow members spanning the lateral distance between said tracks, at least certain of said bow members being movable and each having its ends supported by a pair of said shoe mechanisms adjacent the hinged ends of said elongated panels, and a flexible canopy overlying said bow members having lower marginal portions thereof anchored to said elongated panels, whereby when said movable bow members are moved in a direction to collapse said canopy the opposite ends of said elongated panel members swing inwardly to permit said canopy to assume a folded configuration.

2. A collapsible cover assembly in accordance with claim 1 in which each track is generally channel-shaped so as to receive therein the lower edges of said elongated panels.

3. A collapsible cover assembly in accordance with claim 2 including a ramp extending upwardly from the bottom of each channel-shaped track for elevating said shoe mechanisms as said canopy is collapsed.

4. A collapsible cover assembly in accordance with claim 3 in which each channel-shaped track is provided with inner and outer side walls, whereby when said movable bow members are moved in a direction to collapse said canopy said ramps elevate said shoe mechanisms sufficiently so that said panels clear said inner side walls to permit the opposite ends of said elongated panels to swing inwardly to permit said canopy to assume a folded configuration.

5. A collapsible cover assembly in accordance with claim 4 including a plurality of weep holes in said outer side walls.

6. A collapsible cover assembly in accordance with claim 1 in which one end region of each track is channel-shaped to provide a bottom wall and upstanding outer and inner side walls with a slot therebetween, the panels at one side extending downwardly into the track of that side and the panels at the other side extending downwardly into the track at said other side, the other end region of the track having an inner side wall of lesser height than the height of the inner side walls of said one end region, and a ramp inclining upwardly to a sufficient elevation so that said hinged panels clear said last-mentioned inner side walls as said opposite ends swing inwardly.

7. A collapsible cover assembly in accordance with claim 1 in which said elongated panels have interleaved knuckles and in which the ends of said bow members include pins extending downwardly into said knuckles to hingedly connect said panels together.

8. A collapsible cover assembly in accordance with claim 1 in which the portion of each track onto which the shoe mechanisms move when said canopy assumes its folded configuration constitutes a separate track section.

9. A collapsible cover assembly in accordance with claim 8 in which each of said track portions is pivoted at the end thereof remote from the remaining track portion, whereby the collapsed canopy may be swung upwardly to permit removal of the box sides.

10. A collapsible cover assembly in accordance with claim 9 including a hood overlying said pivotal track portions, said hood being fixedly attached to said track portion so that said hood and track portions can be swung upwardly together.

11. A collapsible cover assembly in accordance with claim 1 including a pivotally mounted tail piece for closing the end of said canopy that would otherwise be open when said canopy is expanded.

12. A collapsible cover assembly in accordance with claim 11 including means associated with said tail piece and engageable by the rearmost bow member to pivot said tail piece upwardly into a vertical position to close said opening as said rearmost bow member expands said canopy.

13. A collapsible cover assembly in accordance with claim 6 including a sprocket rotatably mounted near each end of each track, a chain entrained about each sprocket, and strip means connected to each chain projecting rearwardly toward the end of the track where the canopy is expanded and connected to the rear bow member so as to urge the rear bow member at each side rearwardly beyond the rear pair of sprockets, said rear pair of sprockets being spaced from the rear extremities of said tracks 14. A collapsible cover assembly in accordance with claim 13 in which the lower flight of each chain passes along the bottom wall of its particular track, and respective pin means providing the connection of each strip means at the forward end thereof to the lower flight of its associated chain so that each strip means also passes along the bottom wall of its particular track, the other end of each strip means being fixedly connected to said rear bow member.

15. A collapsible cover assembly in accordance with claim 11 including a fixedly mounted head piece beneath said hood, and resilient means extending between said head piece and said canopy to pull said canopy taut when said canopy is expanded.

16. A collapsible cover assembly for truck boxes and the like comprising a pair of spaced tracks each having a bottom surface at one elevation and inner and outer sides providing raised surfaces, means associated with each track sloping upwardly from a portion of the bottom surface to a portion of the inner raised surface, a plurality of shoe mechanisms guided for longitudinal movement by said tracks, each shoe mechanism including a pair of elongated panels hinged together about a substantially vertical axis at their adjacent ends and movable up the sloping means onto the raised inner surface of that track with which that mechanism is associated, and a flexible canopy overlying said bow members having lower marginal portions anchored to said elongated panels, whereby when said movable bow members are moved in a direction to collapse said canopy said adjacent panel ends are elevated onto said raised inner surfaces via said sloping means so that the opposite ends of said elongated panels can swing inwardly to permit said canopy to assume a folded configuration.

* * * * *